United States Patent [19]

Hagiwara et al.

[11] 4,379,501
[45] Apr. 12, 1983

[54] VENTILATED DISK BRAKE

[75] Inventors: Yutaka Hagiwara, Fujisawa; Toshiaki Takada; Tetu Yamazaki, both of Yokohama, all of Japan

[73] Assignee: Nissan Motor Co., Ltd., Yokohama, Japan

[21] Appl. No.: 237,620

[22] Filed: Feb. 24, 1981

[30] Foreign Application Priority Data

Feb. 27, 1980 [JP] Japan .................................. 55-22811

[51] Int. Cl.³ .......................................... F16D 65/847
[52] U.S. Cl. ............................................. 188/218 XL
[58] Field of Search .................. 188/18 A, 71.6, 73.1, 188/218 XL, 264 AA; 192/107 R, 113 A

[56] References Cited

U.S. PATENT DOCUMENTS

| 2,215,421 | 9/1940 | Eksergian | 188/218 XL |
| 2,464,754 | 3/1949 | Tack. | |
| 3,298,476 | 1/1967 | Day. | |
| 3,314,509 | 4/1967 | Pelikan. | |
| 4,083,435 | 4/1978 | Gallus et al. | 188/218 XL |

FOREIGN PATENT DOCUMENTS

| 28875 | 11/1949 | Australia. | |
| 217758 | 1/1958 | Australia. | |
| 269947 | 11/1964 | Australia. | |
| 283819 | 7/1965 | Australia. | |
| 418829 | 2/1969 | Australia. | |
| 461588 | 5/1974 | Australia. | |
| 489294 | 3/1977 | Australia. | |
| 516311 | 7/1979 | Australia. | |
| 1038593 | 9/1958 | Fed. Rep. of Germany. | |
| 1887749 | 2/1964 | Fed. Rep. of Germany. | |
| 1575813 | 1/1970 | Fed. Rep. of Germany. | |
| 1630304 | 6/1971 | Fed. Rep. of Germany. | |
| 1114296 | 5/1968 | United Kingdom. | |
| 1173028 | 12/1969 | United Kingdom. | |
| 1201627 | 8/1970 | United Kingdom. | |
| 1421952 | 1/1976 | United Kingdom. | |
| 2024966 | 1/1980 | United Kingdom | 188/218 XL |

Primary Examiner—Duane A. Reger
Attorney, Agent, or Firm—Thompson, Birch, Gauthier & Samuels

[57] ABSTRACT

A ventilated disk brake includes a pair of brake pads which is substantially the same as the prior art, and a rotor. The rotor has a brake-pad engaging portion in which a pair of brake-pad engaging walls are formed to be pressed between and by the pair of brake pads. A plurality of cooling ribs extend radially between the pair of brake-pad engaging walls. The cooling ribs are formed in such a manner that the weight distribution thereof is ununiform in the peripheral direction thereof along the brake-pad engaging portion. For example, the cooling ribs can be different in thickness, length and/or arrangement interval. such a design can be made on the basis of empirical data.

12 Claims, 6 Drawing Figures

FIG.1
(PRIOR ART)
FIG.2
(PRIOR ART)
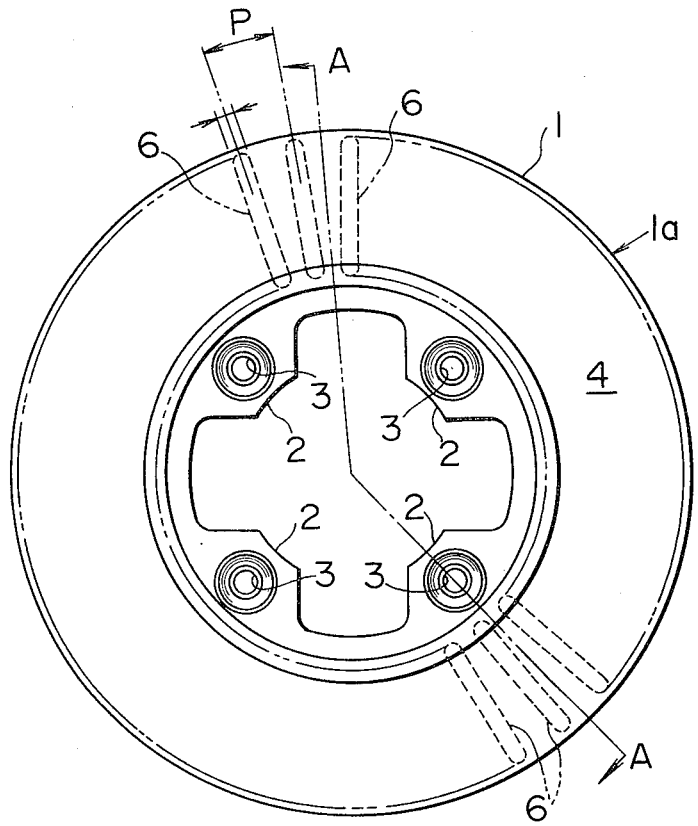
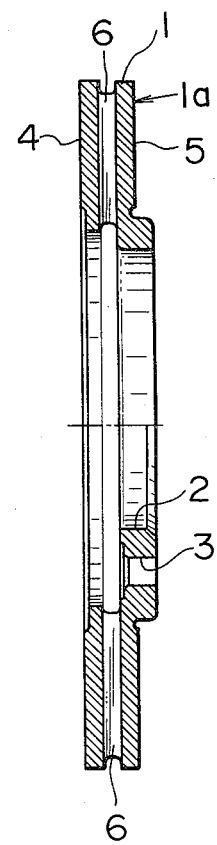

VENTILATED DISK BRAKE

BACKGROUND OF THE INVENTION

The present invention relates to a rotor of a ventilated disk brake.

A ventilated disk brake is used to brake a rotating member such as a rotor rotating in response to rotation of a wheel or wheels by pressing it between a pair of brake pads, for example. In this respect, the ventilated disk brake is similar to a general disk brake. However, the ventilated disk brake differs from such a general disk brake because in the former the heat generated by friction between the rotor and the brake pads is radiated through a plurality of cooling ribs radially extending between the brake pad engaging walls of the rotor so as to increase the radiation efficiency.

FIGS. 1 and 2 show a conventional ventilated disk brake. A circular rotor body 1 has projections 2 at the inner edge thereof in which through-holes 3 are formed, respectively. The rotor body 1 is fixed to a hub portion of a vehicle wheel by bolts inserted into such through-holes. A pair of brake-pad engaging portions 1a are formed at the outer periphery of the rotor body 1. The rotor body 1 rotates in response to the wheels, and when the engaging walls 4, 5 of the rotor body 1 are pressed between a pair of brake pads (not shown), the rotor body 1 is braked by friction. As many cooling ribs 6 are formed to extend radially between the brake-pad engaging walls 4, 5, the heat generated by friction therebetween is transmitted to the ribs 6 and radiated therethrough into the atmosphere. Thus, the radiation efficiency is improved.

However, as shown in FIG. 1, in the conventional disk brake rotors, each of the cooling ribs 6 is uniform in size, shape and arrangement. For example, the thickness "t" of each cooling rib 6 is uniform. Also, each P pitch between the ribs 6 is uniform. Weight distribution at the circumference of the brake-pad engaging portion 1a of the rotor is uniform. As a result, as schematically shown by the uniformly distributed resonance waves "e" in FIG. 6 in which four-nodes natural resonance waves are illustrated, the resonance phenomenon easily occurs in the conventional disk brake rotor. For instance, as shown in FIG. 5, the impulse response characteristics a, b on the basis of some experiments indicate that the oscillation damping performance is very poor. In the experiments, the impulse of 100 g was given to a rotor with the diameter of 250 mm at a circle spaced from its center by 100 mm, and the oscillation was measured at the same place. The characteristics a, b mean that the oscillation has $\pm 2.0$ dB at the begining and is maintained at $\pm 0.3$ dB 0.1 seconds thereafter. As can be seen from the foregoing, the conventional disk brake rotor has a very poor oscillation damping performance so that undesirable brake noise occurs. It results in decreasing of the disk brake commercial values.

SUMMARY OF THE INVENTION

A ventilated disk brake includes a pair of brake pads which is substantially the same as the prior art, and a rotor. The rotor has a brake-pad engaging portion in which a pair of brake-pad engaging walls are formed to be pressed between and by the pair of brake pads. A plurality of cooling ribs extend radially between the pair of brake-pad engaging walls. The cooling ribs are formed in such a manner that the weight distribution thereof is non uniform in the peripheral direction thereof along the brake-pad engaging portion. For example, the cooling ribs can be different in thickness, length and/or arrangement interval. Such a design can be made on the basis of empirical data.

Therefore, it is the object of the present invention to provide a ventilated disk brake in which substantially no uniform resonance waves occur so that the defects of the prior art disk brake as above-stated can be solved.

BRIEF DESCRIPTION OF THE DRAWINGS

These and other objects, features and advantages of the present invention will become more apparent from the following description of preferred embodiment thereof when taken in conjunction with the accompanying drawings in which:

FIG. 1 is a schematic front view showing a conventional disk brake rotor;

FIG. 2 is a sectional view of the conventional disk brake rotor taken along the line A—A in FIG. 1;

DETAILED DESCRIPTION OF THE PREFERRED EMBODIMENTS

Like or corresponding members or parts are designated by the same references as in FIGS. 1 and 2 showing the prior art disk brake rotor so that those will not be described in detail.

Figure 3:
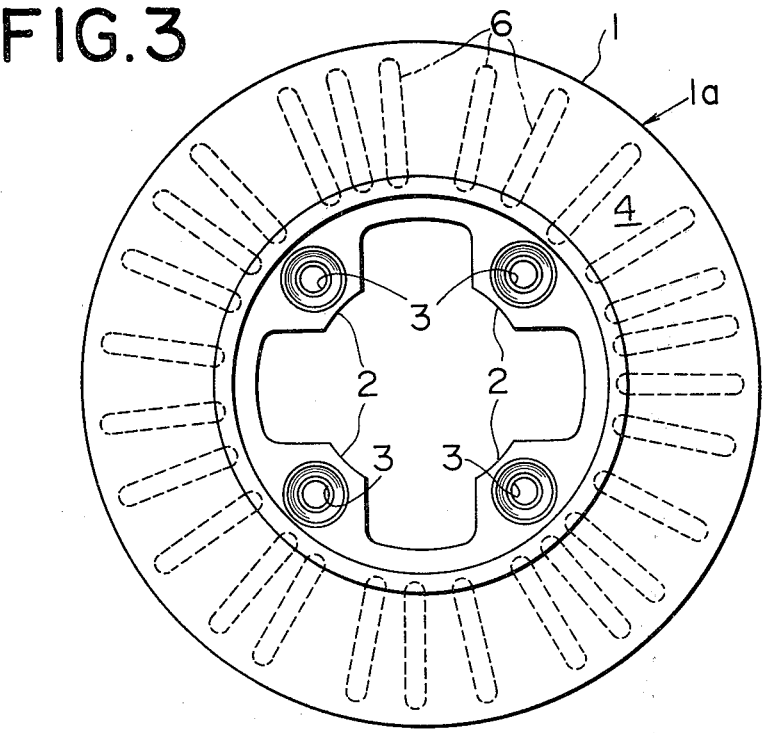
FIG. 3 is a schematic front view showing a disk brake rotor according to the present invention.

FIG. 3 shows a first embodiment of the present invention. Twenty seven cooling ribs 6 are provided radially between a pair of brake-pad engaging walls which may be substantially the same as in FIGS. 1 and 2. All cooling ribs 6 have the same thickness like the prior art shown in FIGS. 1 and 2. However, the arrangement of the cooling ribs 6 differs from the prior art. The cooling ribs 6 are located at irregular or non uniform intervals in such a manner that the weight center and the rotation center of the disk brake rotor can be properly located to obtain rotation balance of the disk brake rotor.

Figure 4:
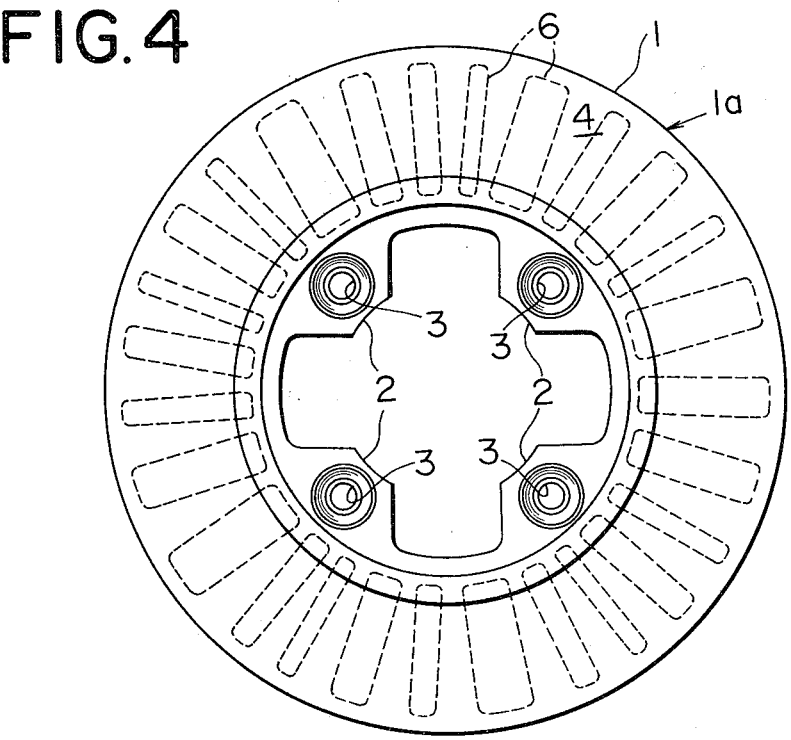
FIG. 4 is a schematic front view showing another disk brake rotor according to a further embodiment of the present invention.

FIG. 4 shows a further embodiment of the present invention. The thicknesses of the cooling ribs 6 are irregular in such a way that the good rotation balance of the disk brake rotor can be obtained by positioning properly the weight center and the rotation center of the disk brake rotor.

It is preferable that more than twenty cooling ribs are used for the practical viewpoints in order to facilitate balancing of the disk brake rotor. If a number of cooling ribs 6 are placed on the whole of the brake-pad engaging portion 1a, the rigidity of the disk brake rotor can be increased, and it becomes easy to obtain the rotation balance thereof.

In operation, as the weight distribution of the brake-pad engaging portion 1a in the peripheral direction is non uniform, no uniformly distributed resonance waves (natural resonance waves) occur.

Figure 5:
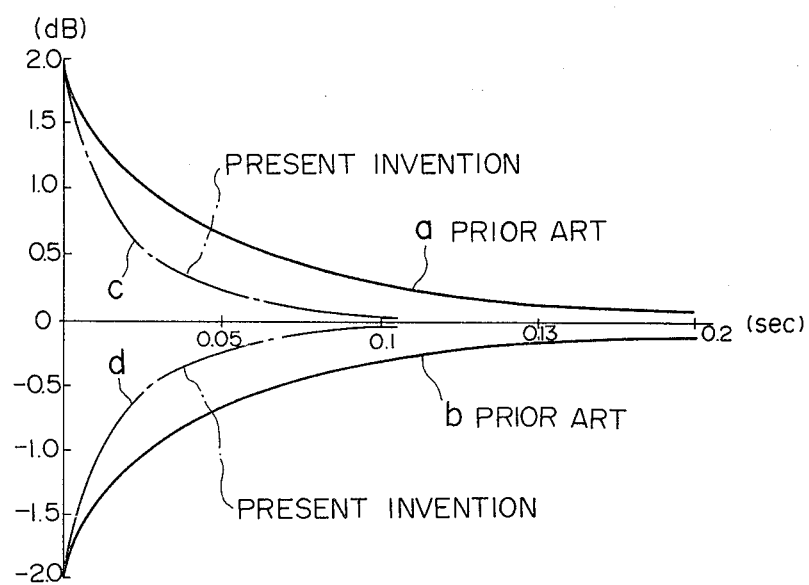
FIG. 5 shows comparatively impulse response characteristics between the conventional disk brake rotor and the disk brake according to the present invention.
Figure 6:
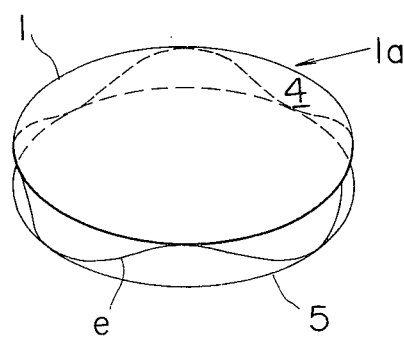
FIG. 6 illustrates four-node uniformly distributed resonance waves occuring in the conventional disk brake rotor shown in FIG. 1.

FIG. 5 shows good impulse response characteristics c, d according to the present invention as a result of some experiments in the same conditions as in the prior art as above-stated. In case of a disk brake rotor according to the present invention, the oscillation thereof is ±2 dB at the beginning and rapidly damped to disappear 0.1 second thereafter. Thus, the oscillation damping performance is excellent. Therefore, no unpleasant noise is produced.

Although specific embodiments of the present invention have been described and shown, the present invention is not limited thereto. For instance, when the weight center of the disk brake rotor is not in alignment with the rotation center thereof, a balancer can be additionally attached onto a proper place thereof to obtain the rotation balance of the disk brake rotor without decreasing of the oscillation damping performance. It can be arranged to a degree that such a balancer is used in a conventional unsymmetrical product in view of a structure thereof.

Also, both the intervals and the thicknesses of the cooling ribs can be set irregular or ununiform. In addition, the length of the cooling ribs can be irregular for the purpose of obtaining substantially the same beneficial results.

We claim:

1. A ventilated disk brake comprising:
   a pair of brake pads;
   a rotor having a brake-pad engaging portion with a pair of brake-pad engaging walls arranged to be pressed between and by the pair of brake pads;
   a plurality of cooling ribs extending radially between the pair of brake-pad engaging walls, the spacing and thickness pattern of said ribs being randomized so that any identical spacing and thickness pattern is not repeated.

2. A ventilated disk brake of claim 1, wherein the number of the ribs is more than twenty.

3. A ventilated disk brake of claim 2, wherein the ribs are located along the whole of the brake-pad engaging portion.

4. A ventilated disk brake comprising:
   a pair of brake pads;
   a rotor having a brake-pad engaging portion with a pair of brake-pad engaging walls arranged to be pressed between and by the pair of brake pads; and
   a plurality of cooling ribs extending radially between the pair of brake-pad engaging walls, the thickness and pitch pattern of said ribs being randomized so that any identical pattern is not repeated.

5. A ventilated disk brake of claim 4, wherein the number of the cooling ribs is more than twenty.

6. A ventilated disk brake of claim 5, wherein the cooling ribs are located along the whole of the brake-pad engaging portion.

7. A ventilated disk brake comprising:
   a pair of brake pads;
   a rotor having a brake-pad engaging portion with a pair of brake-pad engaging walls arranged to be pressed between and by a pair of brake pads; and
   a plurality of cooling ribs extending radially between the pair of brake-pad engaging walls, the thickness pattern of said ribs being randomized so that any identical pattern is not repeated.

8. A ventilated disk brake of claim 7, wherein the number of the cooling ribs is more than twenty.

9. A ventilated disk brake of claim 8, wherein the cooling ribs are located along the whole of the brake-pad engaging portion in a non uniform manner.

10. A ventilated disk brake comprising:
    a pair of brake pads;
    a rotor having a brake-pad engaging portion with a pair of brake-pad engaging walls arranged to be pressed between and by the pair of brake pads; and
    a plurality of cooling ribs extending radially between the pair of brake-pad engaging walls, the circumferential spacing between and the thicknesses of said ribs being randomized in a manner such that uniformly distributed resonance waves are prevented from occuring.

11. A ventilated disk brake of claim 10, wherein the number of the cooling ribs is more than twenty.

12. A ventilated disk brake of claim 11, wherein the cooling ribs are located along the whole of the brake-pad engaging portion in a non uniform manner.

* * * * *